United States Patent [19]

Akashi et al.

[11] Patent Number: 4,676,623

[45] Date of Patent: Jun. 30, 1987

[54] SOLID-STATE IMAGING DEVICE

[75] Inventors: Akira Akashi, Yokohama; Kenji Suzuki, Kawasaki, both of Japan

[73] Assignee: Canon Kabushiki Kaisha, Tokyo, Japan

[21] Appl. No.: 803,514

[22] Filed: Dec. 2, 1985

Related U.S. Application Data

[63] Continuation of Ser. No. 627,466, Jul. 3, 1984, abandoned.

[30] Foreign Application Priority Data

Jul. 14, 1983 [JP] Japan .................................. 58-128973

[51] Int. Cl.⁴ .............................................. G03B 3/00
[52] U.S. Cl. ................................ 354/408; 358/213.23; 250/208

[58] Field of Search ...................... 354/400, 402, 408; 358/212, 213

[56] References Cited

U.S. PATENT DOCUMENTS

| | | |
|---|---|---|
| 3,860,935 | 1/1975 | Stauffer. |
| 4,290,693 | 9/1981 | Stein .................................... 354/408 |
| 4,304,474 | 12/1981 | Stein .................................... 354/408 |
| 4,329,033 | 5/1982 | Masunaga et al. .................. 354/408 |
| 4,458,145 | 7/1984 | Voles .................................... 354/402 |

*Primary Examiner*—Russell E. Adams
*Attorney, Agent, or Firm*—Fitzpatrick, Cella, Harper & Scinto

[57] ABSTRACT

A solid-state imaging device including a plurality of line sensors has means for adding image signals from the line sensors arranged on the solid-state image device.

10 Claims, 27 Drawing Figures

SOLID-STATE IMAGING DEVICE

This application is a continuation of application Ser. No. 627,466 filed July 3, 1984, now abandoned.

BACKGROUND OF THE INVENTION

1. Field of the Invention

The present invention relates to a solid-state imaging device, and more particularly to a solid-state imaging device used for a sensor for detecting an infocus state by a focused light flux from an imaging lens in a single lens reflex type camera.

2. Description of the Prior Art

The in-focus state detection system used in a prior art TTL type in-focus state sensor are divided into two major categories, one using a method in which the infocus state is detected by detecting sharpness of an image by a focused light flux, by a photo-sensor, that is, a blur image sensing method, and the other using a method in which the in-focus state is detected by calculating the refocusing of an image lens based on a relative positional relationship of two images formed by a special optical system, that is, an image deviation detecting method. The staggered image detecting method can directly detect the defocusing of the image lens and provide a relatively large defocusing signal. Accordingly, it can effectively detect the in-focus state which cannot be detected by the defocused image detecting method.

Figure 1:
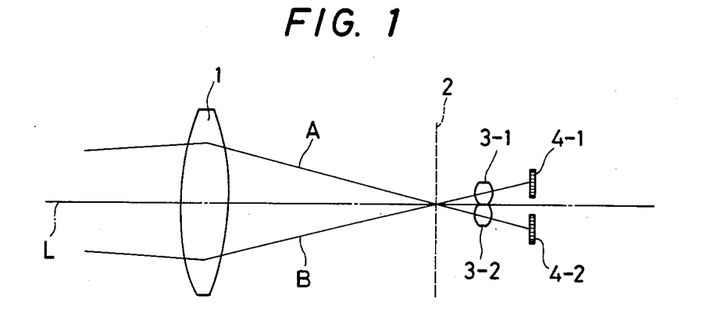
FIG. 1 is a schematic view of an optical system in a prior art staggered image detection method.

FIG. 1 schematically shows an optical system in the staggered image detecting method. In FIG. 1, an object image formed on a predetermined image plane 2 by focusing light fluxes A and B from the periphery of an image lens 1 is focused on two line sensors 4-1 and 4-2 each having a plurality of photo-sensors by two secondary focusing lenses 3-1 and 3-2. The outputs from those line sensors are compared to detect the relative positional relationship of the two object images to determine an in-focus state or an out-of-focus state of the image lens 1.

In this method, the outputs from the two line sensors must be equal in the in-focus state. In actuality, however, incident lights to the line sensors is formed by off-axis focused images formed by the image lens and contains comatic aberrations and distortions. Accordingly, in order for the outputs from the two line sensors, that is, light intensity distributions of the two line sensors, to be equal, the optical positions of the image lens, the secondary focusing lenses and the two line sensors must be accurate and precise. Accordingly, the cost increases and practical implementation is difficult to attain.

Figure 2:
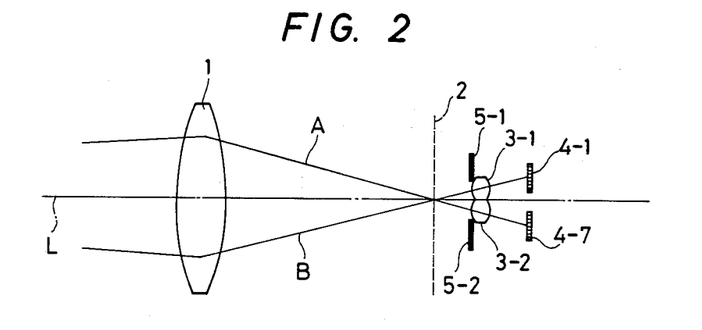
FIG. 2 shows a method for uniforming a light intensity distribution of a line sensor.

Several methods for making the light intensity distributions on the two line sensors equal have been proposed. In a method shown in FIG. 2, light shield means 5-1 and 5-2 are arranged in front of secondary focusing lenses 3-1 and 3-2 near a secondary focusing plane to effectively reduce apertures of the secondary focusing lenses 3-1 and 3-2 to attain the equality of the light intensity distributions on the two photosensing planes. In this method, however, if it is desired to efficiently utilize the light applied to the line sensors, the apertures of the light shield members must be adjusted due to differences of aperture F-number values and exit pupil positions of the imaging lenses.

In a single lens reflex type camera, because of various exchangeable lenses, the aperture F-number values of the image lenses vary. As a result, the focused light flux may be shaded depending on the height of the image, as shown in FIG. 3A.

Figure 3A:
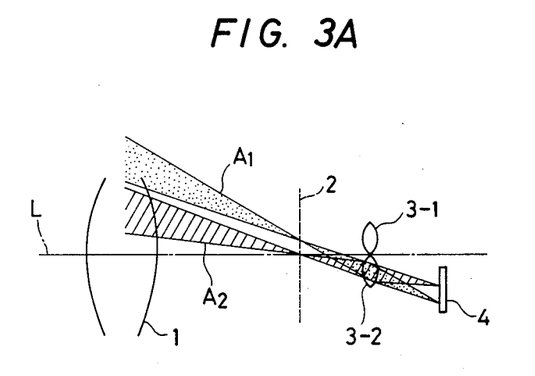
FIGS. 3A and 3B illustrate shading of a focused light flux depending on a height of an image.

In FIG. 3A, let us consider two light fluxes A1 and A2 focused at two different positions on a primary focusing plane 2. If the aperture of the image lens 1 is large enough to cover both light fluxes A1 and A2, no shading occurs, but if the aperture F-number of the image lens 1 is small, the light flux A1 is shaded.

Figure 3B:
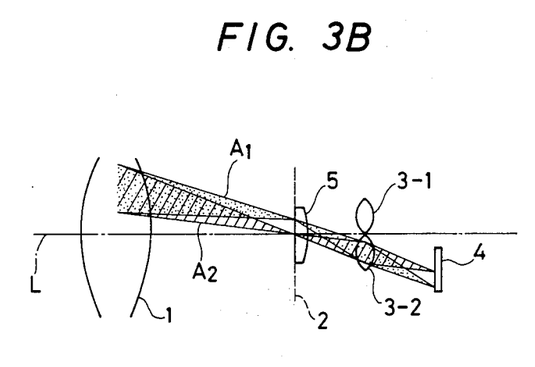
Figure 4:
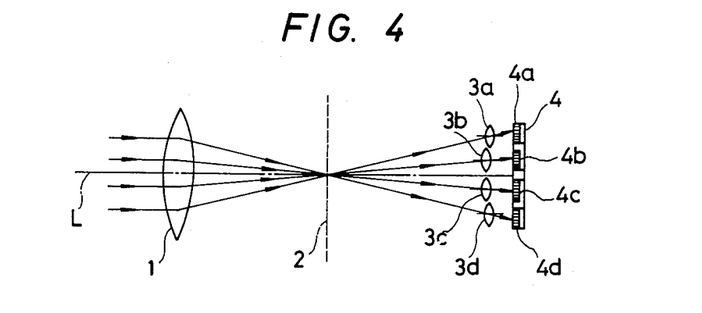
FIG. 4 illustrates switching of line sensors depending on the height of the image.

In order to avoid the above phenomenon, it has been proposed to arrange four sets of secondary focusing lenses 3a, 3b, 3c and 3d and line sensors 4a, 4b, 4c and 4d as shown in FIG. 4 so that they are selectively used depending on the image lens 1. However, this method is expensive because four sets of secondary focusing lenses are used and the arrangement thereof must be adjusted. In order to avoid the above problems, a field lens 5 is placed on the primary focusing plane as shown in FIG. 3B to put the exit pupil of the image lens and the entrance pupil of the secondary focusing lens in a focusing relation to prevent the so-called shading.

As an optical system of a compact and precise focusing device, two line sensors are arranged at a position behind the focusing plane of the image lens at which an object image is formed by the secondary focusing lens having a deflection optical member for monotonously and continuously changing the polarizing angle of incident light for refocusing the object image formed on the focusing plane to measure a light intensity distribution of the object image by means of the secondary focusing system.

An optical system to which an embodiment of the present invention can be applied is briefly explained.

Figures 5A, 5B:
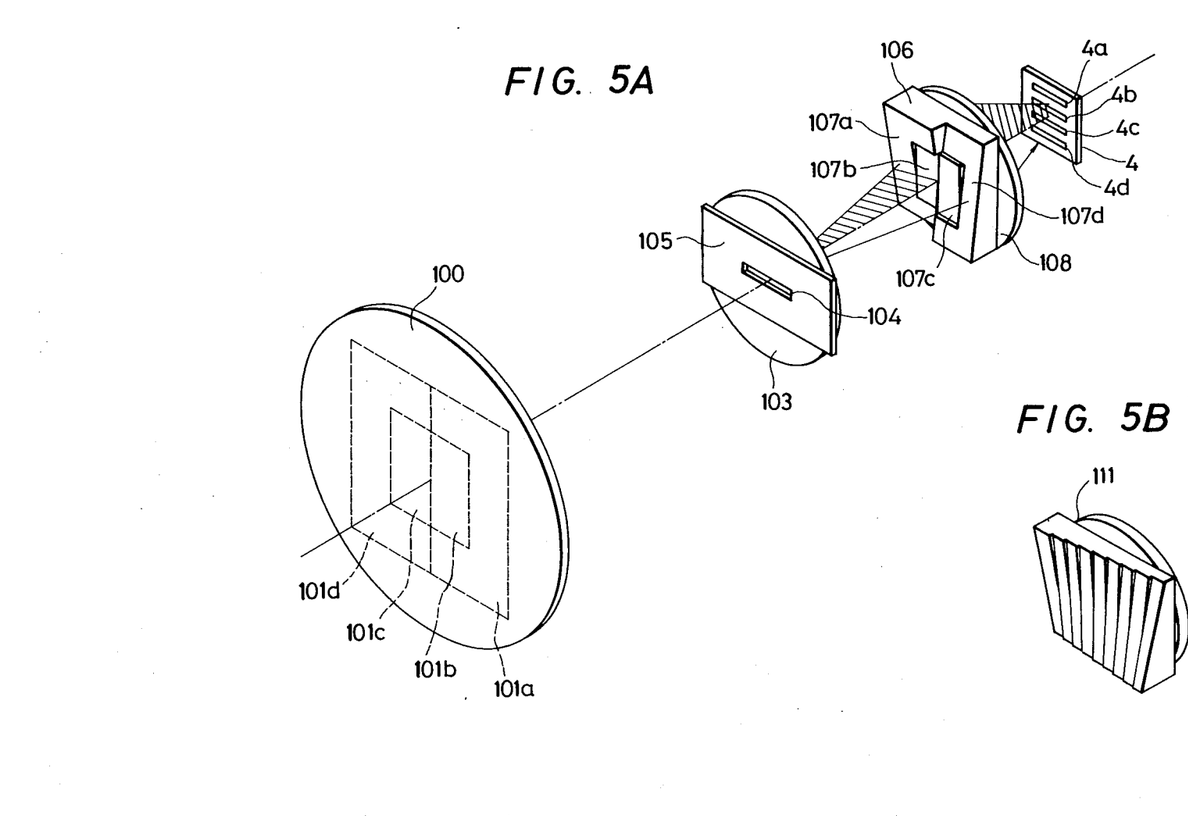
FIGS. 5A and 5B show schematic views of an optical system of an in-focus state detecting device to which the solid-state imaging device of the present invention is applied.

FIGS. 5A and B shows the configuration of an optical system of an in-focus state detecting device to which a solid-state imaging device according to the present invention is applied.

Figure 6:
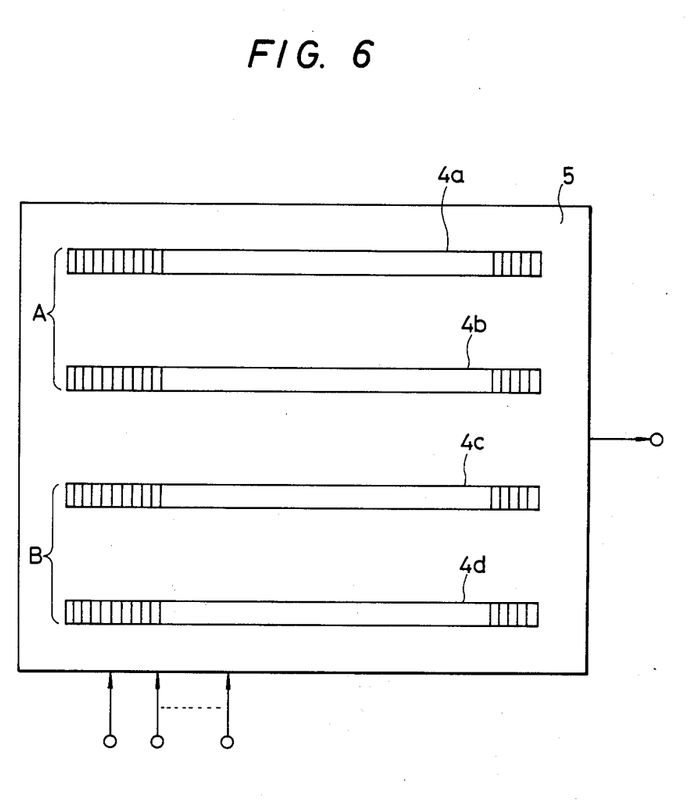
FIG. 6 is a plan view of a first embodiment of the present invention.

FIG. 6 shows an enlarged view of the solid-state imaging device of the present invention.

In FIGS. 5 and 6, numeral 100 denotes an image lens, numerals 101a, 101b, 101c and 101d denote divided pupil areas, numeral 103 denotes a field lens, numeral 105 denotes a field mask having an aperture 104, numeral 106 denotes a polarizing prism plate which is divided into pupil areas 107a, 107b, 107c and 107d corresponding to the pupil areas 101a, 101b, 101c and 101d of the image lens 100, and numeral 108 denotes a secondary focusing lens. The polarizing prism 106 may have gradually and continuously changing apex angles as shown in FIG. 5B. Numeral 4 denotes a sensor having line sensors 4a, 4b, 4c and 4d attached to a substrate 5.

The operation of the optical system shown in FIG. 5 is now explained.

Light transmitted through the image lens 100 is applied to the polarizing prism 106 through the field mask 105 and the field lens 103. When the image lens 100 is in a defocused state, the light passes through the polarizing prism 106 at different points along a lateral line having different indexes of refraction. Accordingly, a light intensity distribution on the sensor 4 is asymmetric.

Even if the F-number of the image lens 100 varies, the signals from the inner line sensors 4b and 4c of the four line sensors are detected and processed so that shading is avoided. Accordingly, the construction is relatively simple and compact. Further, an intelligent function such as light flux width switching in accordance with a brightness of the object is readily attained.

The F-number mode selection of the image lens may be effected in the following manner. When the exit pupil of the image lens is large, a sufficient light intensity is obtained. In order to reduce a noise component, the line sensor signals from a set A (4a, 4b) and a set B (4c, 4d) are added for each pixel. The line sensors of the set A generate the image signal from the light fluxes transmitted through the pupil areas 101a and 101b of the image lens, and the line sensors in the set B generate the image signal from the light fluxes transmitted through the pupil areas 101c and 101d, and those signals are processed. This is referred to as mode 1.

When the exit pupil of the image lens is small, the light fluxes transmitted through the pupil areas 101b and 101c close to the optical axis on the image lens are utilized in order to prevent shading. Accordingly, the line sensor 4b is used as the set A and the line sensor 4c is used as the set B, and the image signals from those sets of line sensors are processed. This is referred to as mode 2.

When the exit pupil of the image lens is large and the brightness of the object is sufficiently high, the mode 1 processing is not necessary and the light fluxes from the pupil areas 101a and 101d distant from the optical axis are utilized because the light fluxes from the pupil areas 101a and 101d distant from the optical axis include large displacement of the object image when they pass through the image lens and the images are sharp. Thus, the line sensor 4a is used as the set A and the line sensor 4b is used as the set B, and the image signals from those sets of line sensors are processed. This is referred to as mode 3.

In the prior art solid-state imaging device, the mode 1 processing is effected by adding the signals of the imaging device by an external analog signal adder or A/D converting the signals of the line sensors 4a, 4b, 4c and 4d and adding them by a digital adder.

In the former method, however, since the levels of the image signals of the line sensors are relatively low, noises are introduced in transmission lines used to transmit the image signals to the external analog adder so that the S/N ratio is lowered and the exact image signals are not produced. On the other hand, in the latter method, since the signals of the line sensors 4a, 4b, 4c and 4d are A/D converted and added, twice as many as registers for latching the A/D converted signals are required in the mode 1 as compared with the number of registers required in the modes 2 and 3. As a result, a large capacity memory is required. Further, in order to A/D convert the signals of the line sensors, a longer processing time is required than that of the former method in which the signals of the line sensors are added by the external analog adder.

An imaging device which adds signals of two adjacent pixels of one line sensor instead of adding signals of corresponding pixels of a plurality of line sensors is disclosed in Japanese Patent Application Laid-Open No. 80119/1983. It is not relevant to the present invention.

SUMMARY OF THE INVENTION

It is an object of the present invention to provide a solid-state imaging device which overcomes the disadvantages of the prior art devices.

It is another object of the present invention to provide a solid-state imaging device which has a reduced memory capacity and an improved processing speed.

It is another object of the present invention to provide a solid-state imaging device having a reduced noise level and a high S/N ratio for the image signal.

It is a further object of the present invention to provide a solid-state imaging device which adds signals of corresponding pixels of line sensors.

DETAILED DESCRIPTION OF THE PREFERRED EMBODIMENTS

Figure 7:
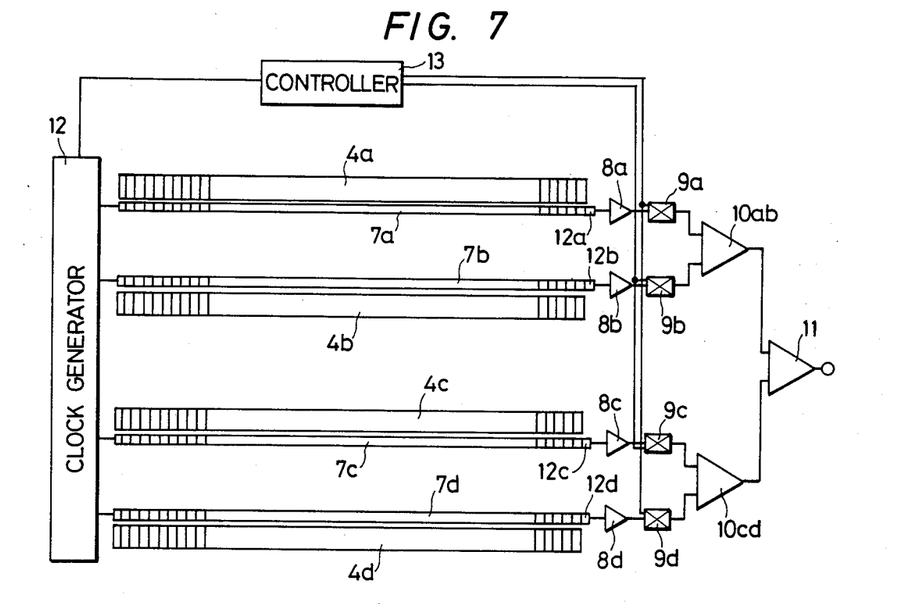
FIG. 7 shows a signal processing unit of the first embodiment of the present invention.

FIG. 7 shows a processing unit of the solid-state imaging device of the present invention.

Signals generated by line sensors 4a, 4b, 4c and 4d are transferred to output circuits through charge transfer devices 7a, 7b, 7c and 7d such as CCD's or BBD's by means of a clock signal from a clock generator 12 which is controlled by a control circuit 13, and they are time-serially supplied to conversion amplifiers 8a, 8b, 8c and 8d which convert the charge signals to voltage signals. Numerals 9a, 9b, 9c and 9d denote analog switches which supply the outputs of the conversion amplifiers 8a, 8b, 8c and 8d to adders 10ab and 10cd by a signal from the control circuit 13. In mode 1, the outputs of the analog switches 9a and 9b and the outputs of the analog switches 9c and 9d are simultaneously supplied to the adders 10ab and 10cd, respectively, to add them, and in mode 2, the outputs of the analog switches 9a and 9d are blocked and only the outputs of the analog switches 9b and 9c are supplied to the adders 10ab and 10cd, respectively. The adder outputs are applied to and output by amplifier 11.

In mode 3, the outputs of the analog switches 9b and 9c are blocked and the outputs of the analog switches 9a and 9d are supplied to the adders 10ab and 10cd, respectively, by the control circuit. The output signals from the adders are A/D converted to digital signals, which are then processed to detect the infocus state.

In accordance with the present embodiment, in mode 1, the outputs signals of the corresponding pixels of the line sensors are added without reducing the S/N ratio of the output signal of the line sensors due to the introduction of noises in the signal transmission lines as was done in the prior art solid-state imaging device which uses the external adder, and the memory capacity of the registers for latching the A/D converted signals can be reduced to one half of that required in the prior art method in which the image signals of the line sensors are A/D converted and added.

Figure 8:
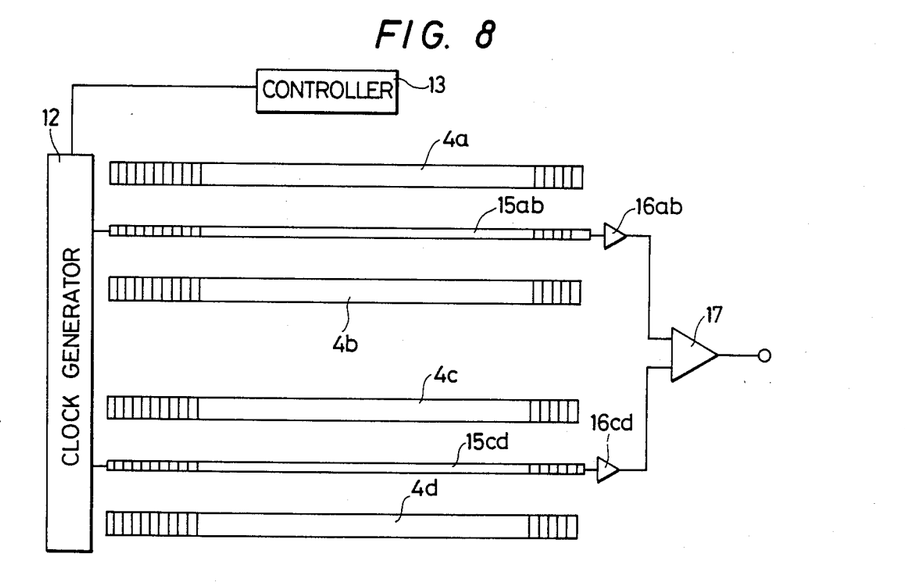
FIG. 8 shows a signal processing unit of a second embodiment of the present invention.

FIG. 8 shows a configuration of a second embodiment of the imaging device of the present invention. In FIG. 8, numerals 4a, 4b, 4c and 4d denote line sensors, numeral 12 denotes a clock generator which generates a clock signal in response to an output of a control circuit 13 which in turn detects the F-number of the image lens to control the output of the clock generator 12.

Numerals 15ab and 15cd denote CCD's for transferring charges of the line sensors 4a and 4b and the line sensors 4c and 4d, respectively, numerals 16ab and 16cd denote conversion amplifiers for converting the charge signals of the line sensors of sets A and B to voltage signals, and numeral 17 denotes an amplifier for alternately outputting the signals of the sets A and B.

The operation of the second embodiment of the imaging device of the present invention is explained with reference to FIGS. 9 to 13 in which like elements are designated by like numerals and the suffixes a, b, c and d correspond to the line sensors 4a, 4b, 4c and 4d.

Figure 9:
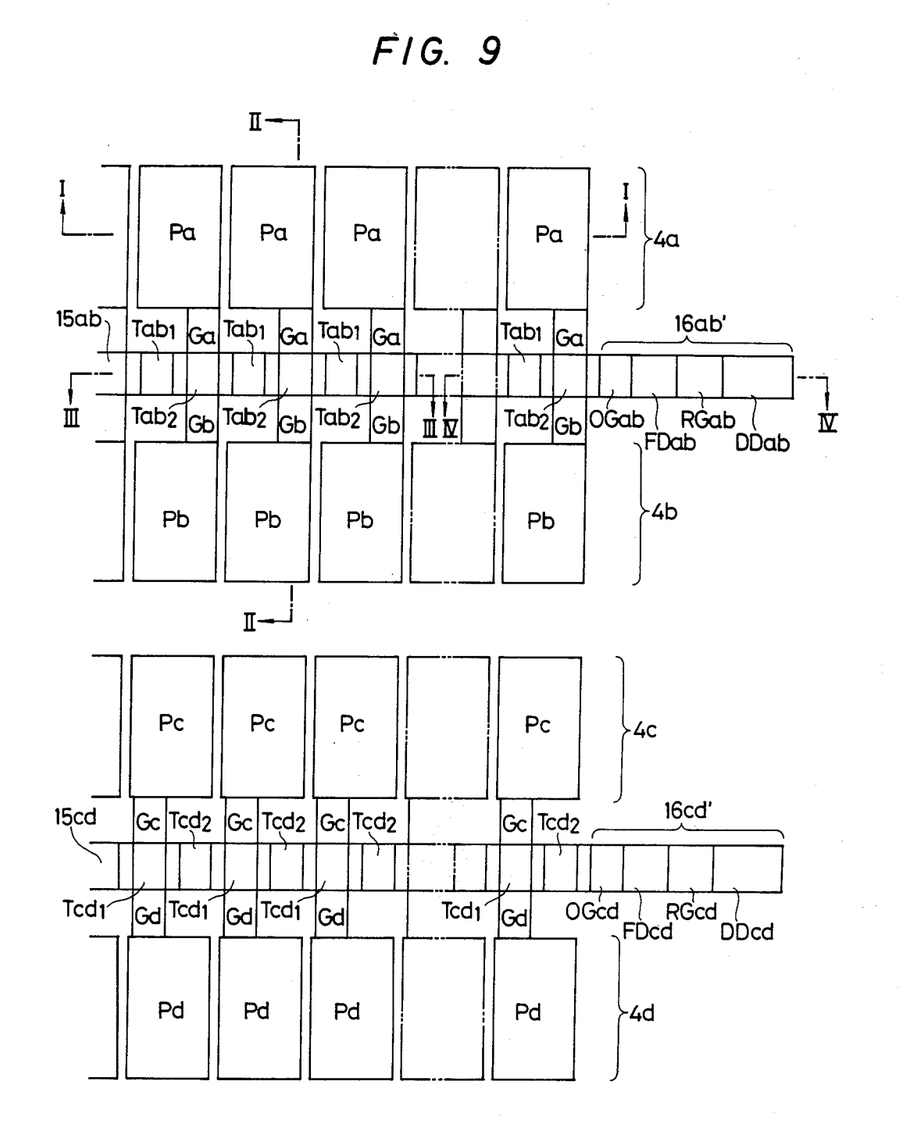
FIG. 9 is an enlarged view of FIG. 8.

FIG. 9 is an enlarged plan view of FIG. 8. Pa, Pb, Pc and Pd denote photo-sensors of the line sensors, Ga, Gb, Gc and Gd denote gates for transferring the charges of the line sensors to the CCD's, Tab1, Tab2, Tcd1 and Tcd2 denote charge transfer areas, OGab, FDab, RGab and DDab denote portions of the conversion amplifiers in the set A, and OGcd, FDcd, RGcd and DDcd denote portions of the conversion amplifiers in the set B.

Sectional views taken along lines I—I, II—II, III—III and IV—IV of FIG. 9 are shown in FIGS. 10 to 13, respectively.

Figure 10A:
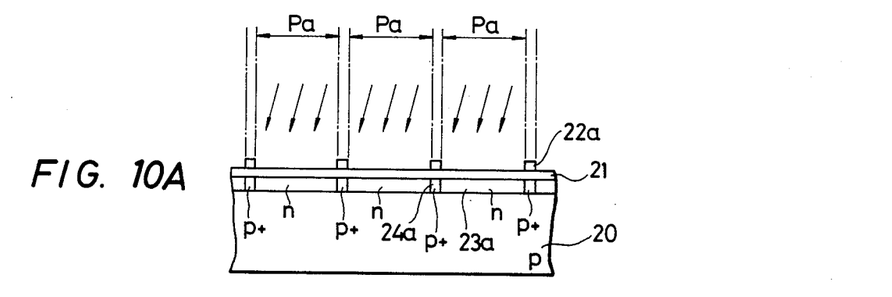
FIG. 10A is a sectional view taken along a line I—I of FIG. 9.

FIG. 10A shows the sectional view taken along the line I—I of FIG. 9.

In FIG. 10A, numeral 20 denotes a P-type semiconductor substrate of the line sensor, numeral 21 denotes an insulation silicon oxide film numeral 22a denotes a light shielding film for blocking an incident light in other than photo-sensing areas, numeral 23a denotes an N-type semiconductor of the line sensor, and numeral 24a denots a P+-type semiconductor having a high potential provided to prevent the charge from being leaked from the line sensor.

Figure 10B:
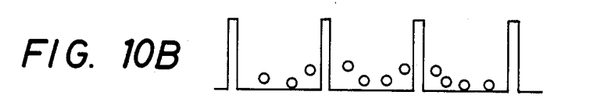
FIG. 10B shows a potential state of a line sensor.

FIG. 10B shows the charges (shown by o) generated by the light radiation at the PN junction of the line sensor and stored in potential wells of the semiconductor.

Figure 11A:
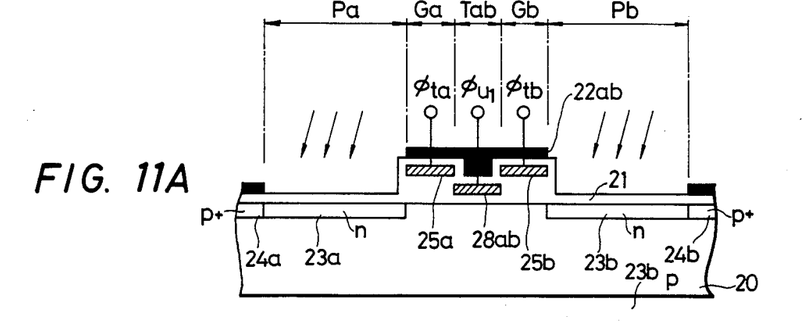
FIG. 11A is a sectional view taken along a line II—II of FIG. 9.

FIG. 11A shows a enlarged sectional view taken along the line III—III of FIG. 9.

Figure 11B:
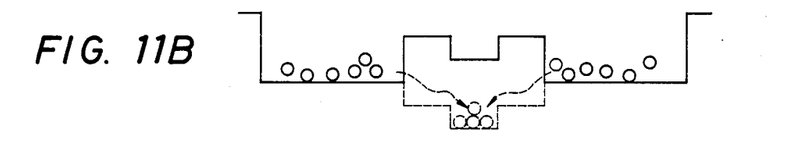
FIG. 11B shows a potential state of FIG. 11A in a mode 1.
Figure 11C:
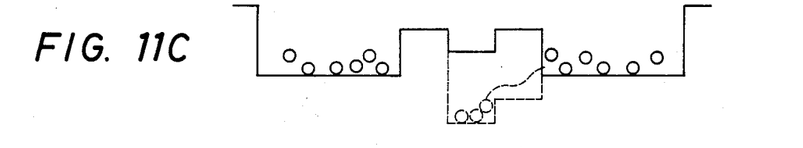
FIG. 11C shows a potential state of FIG. 11A in a mode 2.
Figure 11D:
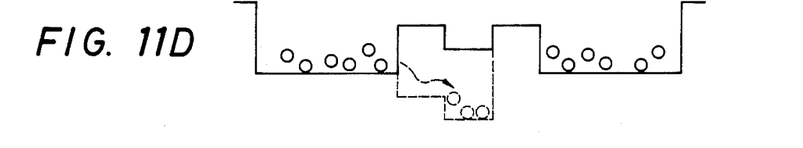
FIG. 11D shows a potential state of FIG. 11A in a mode 3.

In FIG. 11A, numeral 25a denotes an electrode of the gate Ga for transferring the charge generated at the photo-sensor Pa by the light irradiation to the charge transfer area CCD. It is connected to a terminal $\phi$ta. Numeral 25b denotes an electrode of the gate Gb for transferring the charge generated at the photo-sensor Pb by light irradiation of the CCD, and it is connected to a terminal $\phi$tb. Numeral 28ab denotes a CCD drive electrode which is connected to a terminal $\phi$u1. FIGS. 11B, 11C and 11D show potential and charge transfer states in the solid-state imaging device in the modes 1, 2 and 3, respectively.

Figure 12A:
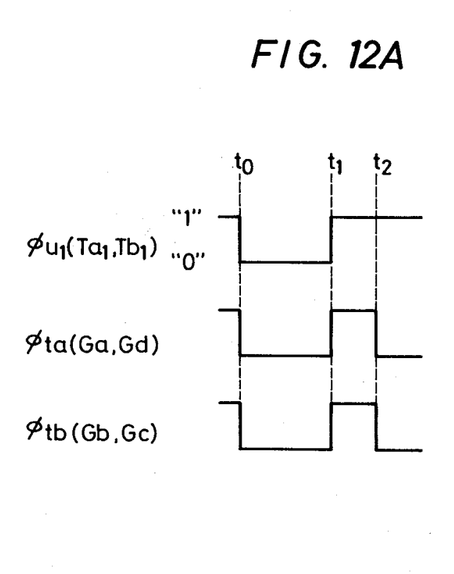
FIGS. 12A, 12B and 12C are time charts showing voltages applied to terminals $\phi u1$, $\phi ta$ and $\phi tb$.
Figure 12B:
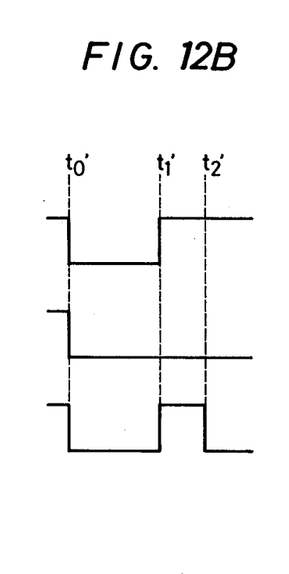
Figure 12C:
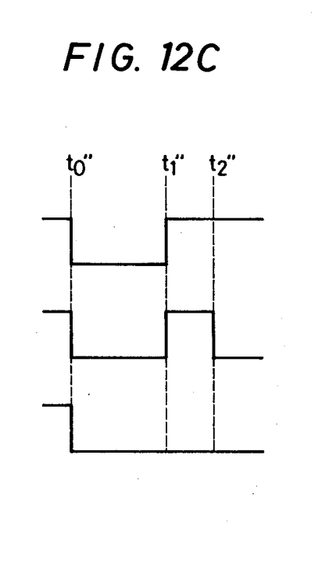

FIG. 12 shows a time chart of voltages applied to the terminals $\phi$u1, $\phi$ta and $\phi$tb.

In the mode 1, the charges in the photo-sensors Pa, Pb, Pc and Pd are transferred to the CCD's. For a period of t0–t1 of the time chart, a voltage equal to or close to zero volt is applied to the terminals $\phi$u1, $\phi$ta and $\phi$tb ($\phi$i1=$\phi$ta=$\phi$tb=0) so that the potential in the semiconductor assumes a state shown by a solid line in FIG. 11B.

Light is irradiated on the photo-sensors Pa and Pb and the charges are stored in the semiconductor. A predetermined time later, a positive voltage is applied to the terminals $\phi$u1, $\phi$t1, $\phi$t2 ($\phi$u1=$\phi$t1=$\phi$t2=1) so that the potential in the semiconductor assumes a state shown by a broken line in FIG. 11B and the charges are transferred from the photo-sensors Pa and Pb to the CCD Tab through the gates Ga and Gb along the potential gradient.

In the mode 2, the charges in the photo-sensors Pb and Pc are transferred to the CCD's Tab2 and Tcd1.

For the period of t0–t1, a voltage equal to or close to zero volt is applied to the terminals $\phi$u1, $\phi$ta and $\phi$tb ($\phi$u1=$\phi$ta=$\phi$tb=0) so that a potential in the semiconductor assumes a state as shown by a solid line in FIG. 11C. A light flux from the object image is irradiated to the photo-sensors Pa and Pb and charges are stored in the semiconductor. A predetermined time later, a positive voltage is applied to the terminals $\phi$u1 and $\phi$tb ($\phi$u1=$\phi$tb=1, $\phi$ta=0) so that the potential in the semiconductor assumes a state shown by a broken line in FIG. 11C. Thus, the charge at the photo-sensor Pb is transferred to the CCD Tab2 along the potential gradient but the charge at the photo-sensor Pa is not transferred to the CCD because the potential at the gate Ga is high.

In the mode 3, the charges at the photo-sensors Pa and Pd are transferred to the CCD's Tab2 and Tcd1. In this mode, a positive voltage is applied to the terminals $\phi$u1 and $\phi$ta ($\phi$u1=$\phi$ta=1, $\phi$tb=0) and only the charge at the photo-sensor Pa is transferred to the CCD as is done in the mode 2.

Figure 13A:
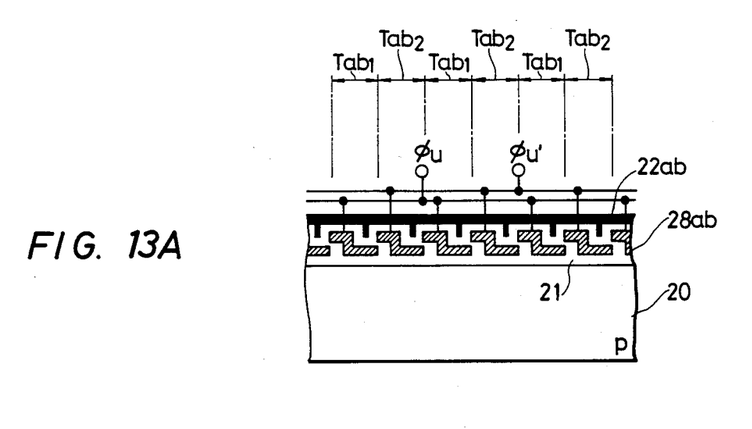
FIG. 13A is a sectional view taken along a line III—III of FIG. 9, FIGS. 13B and 13C show potential states of the section III—III of FIG. 9.
Figure 13B:
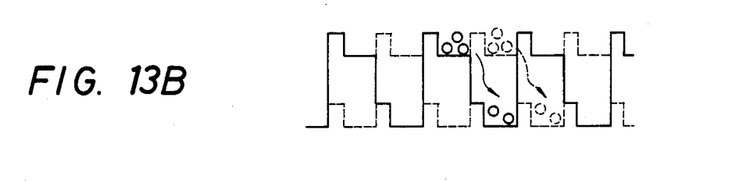
Figure 13C:
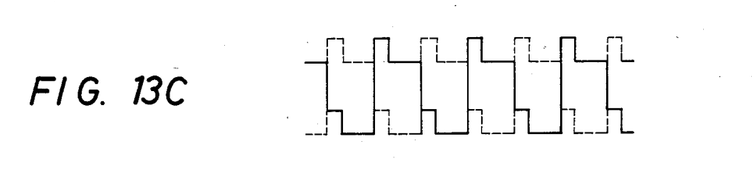

In this manner, the charges at the photo-sensors Pa, Pb, Pc and Pd are transferred to the CCD's Tab2 and Tcd1 through the gates Ga, Gb, Gc and Gd. The transfer operation in the CCD is now explained with reference to FIG. 13.

Figure 14:
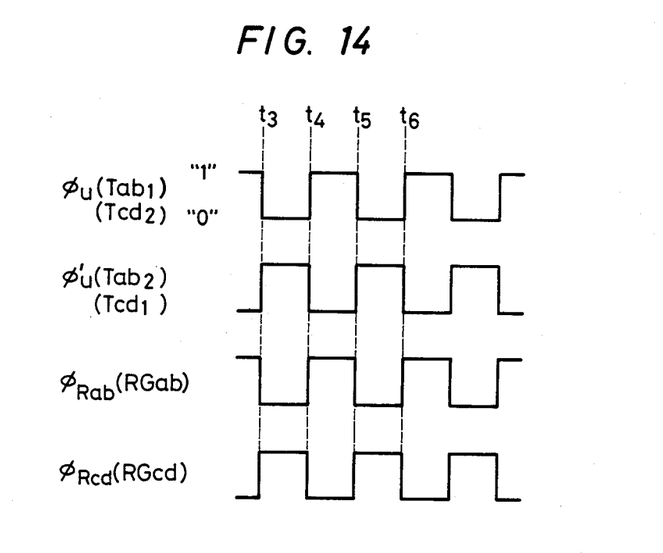
FIG. 14 is a time chart showing voltages applied to terminals $\phi u$, $\phi u'$, $\phi Rab$ and $\phi Rcd$.

FIG. 13A shows a sectional view taken along the line III—III of FIG. 9. In FIG. 13, $\phi$u and $\phi$u' denote terminals to input the clock signal for the transfer in the CCD. The terminal $\phi$u is connected to the electrode Tab1 and the terminal φu' is connected to the electrode Tab2. As shown in FIG. 14, the clocks of opposite phases are applied to the terminals φu and φu'. The electrode 28ab is bent to impart a step to the potential state so that two-clock drive is attained.

FIG. 13B shows a potential of the CCD in the set A, and FIG. 13C shows a potential of the CCD in the set B. In FIGS. 13B and 13C, solid lines show potentials at the same time and broken lines show potentials at different times. In the set A, when φu=0 and φu'=1, the potential is shown by the solid line in FIG. 13B. The charges transferred from the photo-sensor are shown by 0 and they are transferred from a high potential area to a low potential area. When φu=1 and φu'=0, the potential is shown by the broken line in FIG. 13B, and the charges transferred when φu'=1 and φu=0 are again transferred along the potential gradient. Accordingly, as the clock signal is continuously applied, the carriers in the CCD are continuously transferred to the right as shown in FIG. 13B. While the structure of the CCD of the set B is not shown in FIG. 13, it is similar to that of the set A except that the phase of the clock signal to the set B is opposite to that of the set A.

Figure 15A:
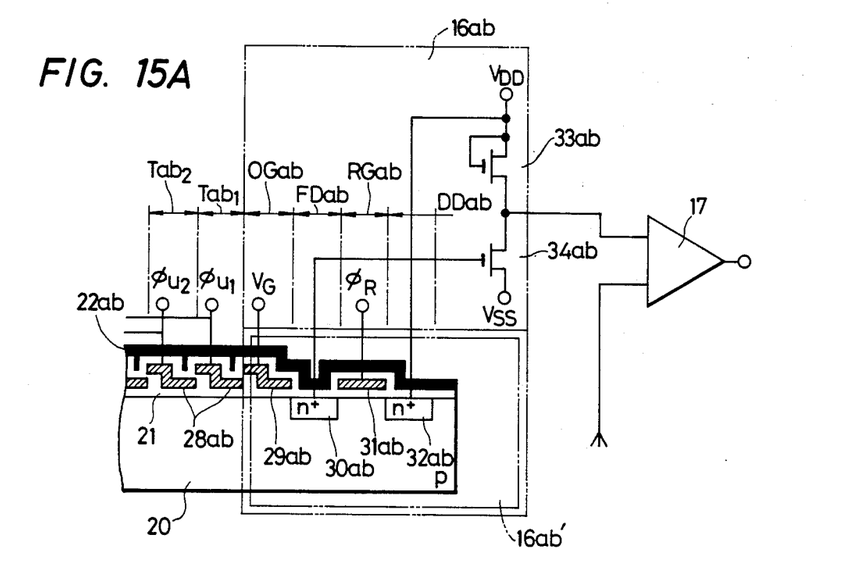
FIG. 15A shows a sectional view taken along a line IV—IV of FIG. 9, and FIGS. 15B and 15C show potential states of the section IV—IV of FIG. 9.

Accordingly, the CCD's in the set A and the CCD's in the set B produce the signal charges alternately to the output stage. The operation of the output stage is explained with reference to FIG. 15. In FIG. 15A, numeral 16ab denotes the conversion amplifier and numeral 16ab' denotes a portion of the conversion amplifier 16ab formed on the same chip. Numeral 29ab denotes a terminal of the output gate OGab to which an appropriate position voltage is applied to maintain a constant potential as shown in FIGS. 15B and 15C.

Numeral 30ab denotes a diffusion region of a floating drain region FDab, which forms a MOS FET together with a reset gate RGab 31ab and a drain region 32ab. Numerals 33ab and 34ab denote FET's formed on the same substrate, and numeral 33ab denotes a load. A source of the FET 34ab is connected to a drain of the FET 33ab.

Figure 15B:
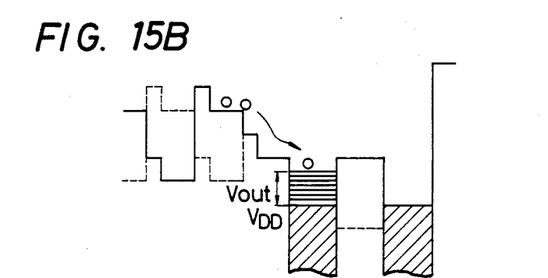
Figure 15C:
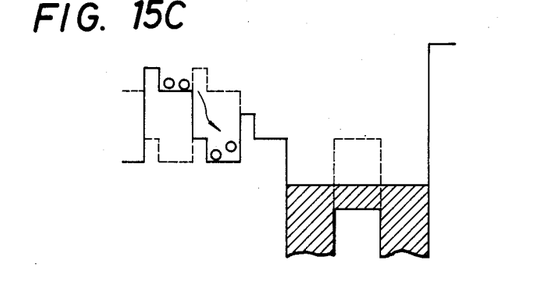

FIGS. 15B and 15C show potentials when the clock pulse is applied to the reset gate RGab 31ab. FIG. 15B shows the potential when a small voltage is applied to the terminal φR of the reset gate RGab (φR=0), and FIG. 15C shows the potential when a positive voltage is applied to the terminal φR of the reset gate RGab (φR=1).

When the voltage is applied to the reset gate RGab and φRab=1, the potential shown in FIG. 15C is obtained, the floating drain FDab and the drain DDab conduct, the charges stored in the floating drain FDab are flow out, and the potential of the floating drain FDab is reset to the potential of the drain DDab. When φRab=0, the potential of the reset gate RGab rises as shown in FIG. 15B and the charges transferred from the CCD through the output gate OGab are stored in the floating drain FDab.

As the charges are stored in the floating drain FDab, the potential of the floating drain FDab rises, and when a gate voltage is applied to the FET 34ab to turn it on, the charges in the floating drain FDab are converted to a voltage and it is supplied to a summing amplifier 17.

As the clocks φRab and φRcd of FIG. 14 are applied, the outputs of the line sensors of the set A and the set B are alternately produced.

In accordance with the present embodiment, the charges are simultaneously transferred from the photo-sensors Pa and Pb to the charge transfer means or the CCd Tab through the gates Ga and Gb. Accordingly, the signals of the line sensors can be added for each pixel without providing the adders 10ab and 10cd of the first embodiment and the construction of the solid-state imaging device is simplified. While the present invention intends to improve the solid-state imaging device of the in-focus state detecting device, it can also be applied to a solid-state imaging device used in other application.

In accordance with the present invention, summing means for summing the signals of the corresponding pixels of the plurality of line sensors, each having a plurality of photo-sensors, of the solid-state imaging device is arranged on the solid-state imaging device. Accordingly, when the output signals of the corresponding pixels of the line sensors are added, the S/N ratio of the output signals of the line sensors is not lowered due to the introduction of the noise in the signal transmission lines as is done in the prior art method in which the adder is arranged externally of the solid-state imaging device. Further, the memory capacity of the registers for latching the A/D converted signals is reduced to one half of that required in the prior art method in which the output signals of the line sensors are A/D converted and added. Accordingly, the signal processing speed is increased and the compact device is attained because the two elements for the solid-state imaging device and the adding means are packaged in one element. The signals of the present solid-state imaging device can be used in a general purpose processing unit.

What we claim is:

1. An imaging device comprising:
   (a) a plurality of one-dimension line sensors each having a plurality of pixels,
   (b) a substrate on which said one-dimension line sensors are arranged,
   (c) adding means arranged on said substrate for adding signals of corresponding pixels of said one-dimension line sensors to produce a sum signal for each pixel,
   (d) an A/D converting circuit for A/D converting the sum signals from said adding means, and
   (e) a latch circuit for latching each of the signals converted by said A/D converting circuit in a respective memory part, the number of said memory parts being identical to that of signals from pixels which one of said line sensors supplies to said adding means.

2. A solid-state imaging device according to claim 1 further comprising:
   (d) charge transfer elements provided one for each of said one-dimension line sensors; and
   (e) a clock generator for generating a clock signal to drive said charge transfer elements to transfer the image signals of the pixels of said one-dimension line sensors.

3. A solid-state imaging device according to claim 2 further comprising:
   (f) an amplifier for amplifying the signals outputted from said charge transfer elements.

4. A solid-state imaging device comprising:
   (a) a plurality of one-dimension line sensors each having a plurality of pixels,
   (b) a substrate on which said one-dimension line sensors are arranged,
   (c) summing means arranged on said substrate for summing signals of corresponding pixels of said one-dimension line sensors, (d) charge transfer elements provided one for each of said one-dimension line sensors; and (e) a clock generator for generating a clock to drive said charge transfer elements to transfer the image signals of the pixels of said one-dimension line sensors, wherein said summing means includes analog switches controlled by the clock generated by said clock generator and an adder for adding the outputs of said analog switches.

5. A solid-state imaging device comprising:
(a) a plurality of one-dimension line sensors each having a plurality of pixels;
(b) charge transfer means for transferring signals of corresponding pixels of two of said plurality of one-dimension line sensors;
(c) gates for transferring the signals of the pixels of said two one-dimension line sensors to said charge transfer means; and
(d) control means for driving said gates to add the signals of the pixels of said two one-dimension line sensors.

6. A solid-state imaging device according to claim 5 further comprising:
(e) an amplifier for amplifying signals outputted from said charge transfer means.

7. A solid-state imaging device cmprising:
(a) a plurality of one-dimension line sensors each having a plurality of pixels;
(b) a substrate on which said one-dimension line sensors are arranged;
(c) summing means arranged on said substrate for summing signals of corresponding pixels of said one-dimension line sensors; and
(d) control means for selecting, by an external control signal, between a mode in which the signals of said one-dimension line sensors are outputted with said summing means being deactivated and a mode in which said summing means is activated to sum the signals of the corresponding pixels of a predetermined combination of said one-dimension line sensors.

8. A solid-state imaging device for an in-focus state detecting device for detecting an in-focus state of an optical system, comprising:
(a) first and second line sensors each having a plurality of pixels for photoelectrically converting light incident on the optical system from a first exit pupil;
(b) a first substrate, on which said first and second line sensors are arranged;
(c) third and fourth line sensors each having a plurality of pixels for photoelectrically converting light incident on the optical system from a second exit pupil smaller than said first exit pupil;
(d) a second substrate, on which said third and fourth line sensors are arranged;
(e) first summing means arranged on said first substrate for summing signals of corresponding pixels of said first and second line sensors;
(f) second summing means arranged on said second substrate for summing signals of corresponding pixels of said third and fourth line sensors; and
(g) a control circuit for selecting, by an external signal, between a mode in which the signals of the pixels of said line sensors are outputted with said first and second summing means being deactivated and a mode in which said first and second summing means are activated to addes the outputs of the pixels of said line sensors.

9. A focus detecting device for an optical system, comprising:
(A) a solid-state imaging device including
(a) a plurality of one-dimension line sensors each having a plurality of pixels,
(b) a substrate on which said one-dimension line sensors are arranged, and
(c) adding means arranged on said substrate for adding signals of corresponding pixels of said one-dimension sensors to form a sum signal for each pixel;
(B) an A/D converting circuit for A/D converting the sum signals from said adding means;
(C) a latch circuit for latching each of the signals for each pixel converted by said A/D converting circuit, in a corresponding memory part, the number of said memory parts being identical to that of signals from pixels which one of said line sensors supplies to said adding means; and
(D) means for detecting a focusing state of the optical system on the basis of an output of said summing means.

10. A solid-state imaging device comprising:
(a) a plurality of one-dimension line sensors each having a plurality of pixels;
(b) a substrate on which said one-dimension line sensors are arranged;
(c) summing means arranged on said substrate for summing signals of corresponding pixels of said one-dimension line sensors; and
(d) control means for selecting by an external control signal, between a mode in which the signals from said line sensors are supplied to said summing means for summing and a mode in which the signals obtained from said sensors are not summed by said summing means.

* * * * *